United States Patent [19]

Hayashi

[11] Patent Number: 5,194,907
[45] Date of Patent: Mar. 16, 1993

[54] DISPLACEMENT DETECTING APPARATUS
[75] Inventor: Yasukazu Hayashi, Niwa, Japan
[73] Assignee: Okuma Corporation, Aichi, Japan
[21] Appl. No.: 735,909
[22] Filed: Jul. 25, 1991
[30] Foreign Application Priority Data Jul. 31, 1990 [JP] Japan .................................. 2-202971

[51] Int. Cl.$^5$ ........................ G01C 3/08; G01S 13/08
[52] U.S. Cl. ...................................... 356/5; 356/28.5; 342/125
[58] Field of Search ................... 356/5, 28.5; 342/125, 342/127, 194

[56] References Cited
U.S. PATENT DOCUMENTS 4,241,995 12/1980 Takahama ............................. 356/5
4,443,107 4/1984 Alexauder et al. ................. 356/5 X
4,715,706 12/1987 Wang ..................................... 356/5

Primary Examiner—Mark Hellner
Attorney, Agent, or Firm—Wenderoth, Lind & Ponack

[57] ABSTRACT

A measured displacement is determined by extracting components proportional to a sine value and cosine value of the displacement from a phase modulated wave in synchronization with a reference wave. A response delay which tends to occur in a PLL circuit due to the variations of the reference wave is not generated. The detecting resolution is determined depending upon that of the A/D convertor. Generally, the higher the resolution of the A/D converter the lower the speed at which the converter operates. However, since the upper digit is obtained by counter, it is possible to engage the low speed A/D converter even if the measured displacement varies at a high speed. For this reason, it is possible to easily detect the measured displacement at a high resolution.

5 Claims, 5 Drawing Sheets

FIG.2A DFR
FIG.2B MSB
FIG.2C CLK'
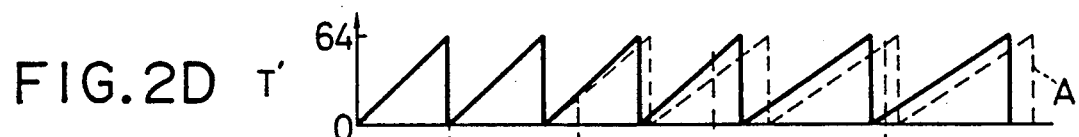
FIG.2D T'
FIG.2E DFP
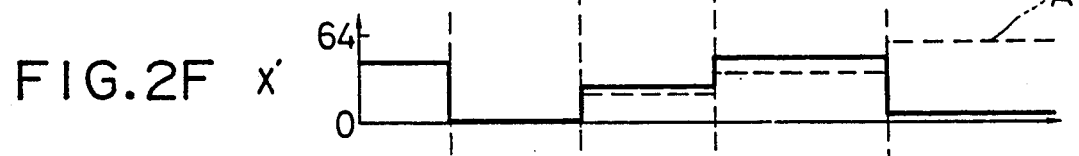
FIG.2F X'
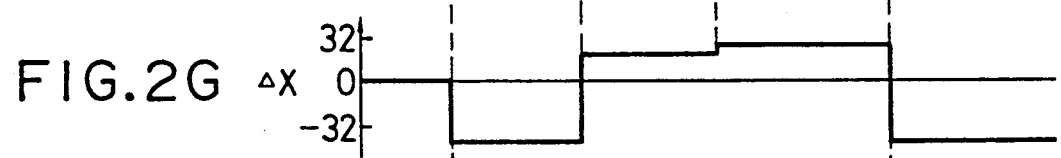
FIG.2G ΔX
FIG.2H Up
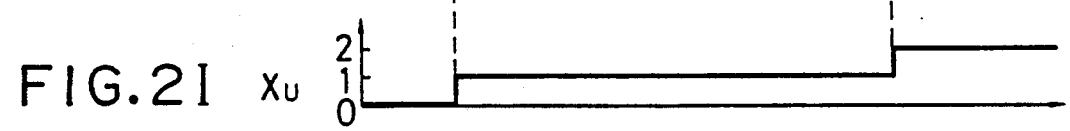
FIG.2I Xu
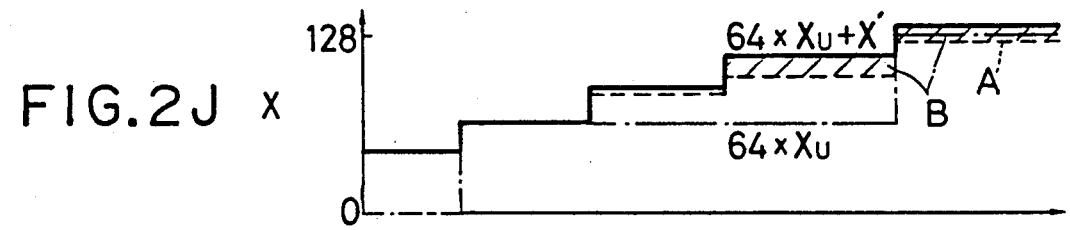
FIG.2J X

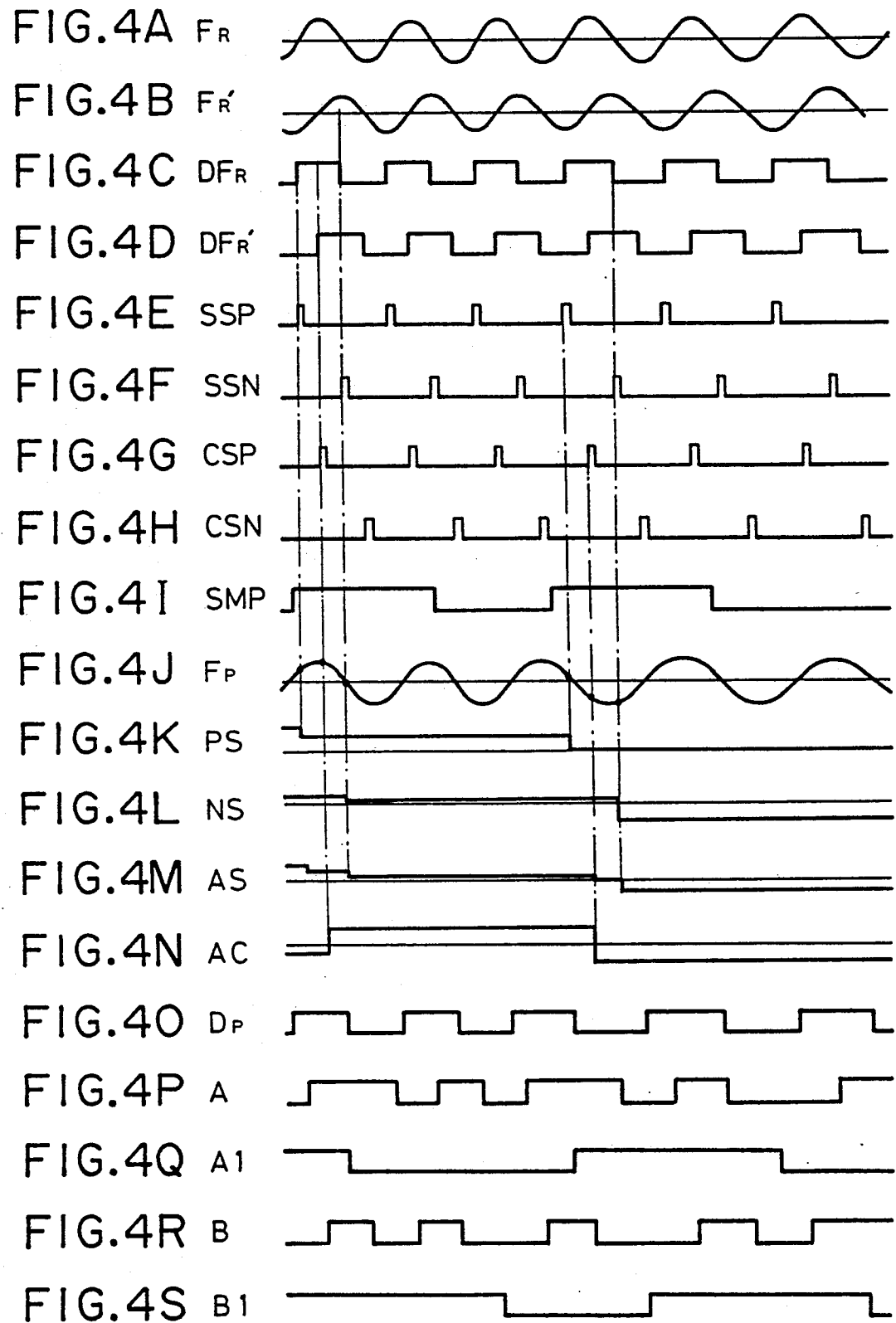

FIG.5A SL 
FIG.5B A1 
FIG.5C B1 
FIG.5D A2 
FIG.5E B2 
FIG.5F UP 
FIG.5G DP 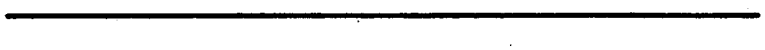
FIG.5H Xu 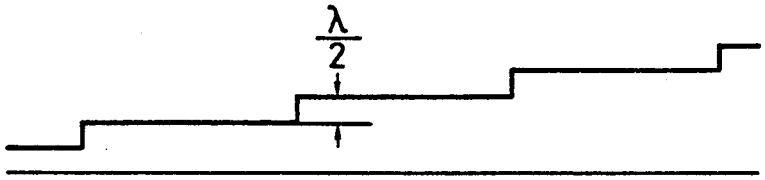

DISPLACEMENT DETECTING APPARATUS

BACKGROUND OF THE INVENTION

1. Field of the Invention

The present invention relates to a displacement detecting apparatus which transforms a signal generated by in particular, a displacement quantity detector which adopts a phase modulation method, such as laser length measuring device and the like, into a numeric value which is proportional to the detected displacement quantity.

2. Description of the Prior Art

Generally, in the displacement detecting apparatus, such as a resolver, an inductosyn, a laser length measuring device and the like, in which a detected displacement quantity is outputted as a numeric value by phase-modulating an input reference wave with the measured displacement quantity, in order to detect the phase difference of the phase modulated wave from the reference wave, the quantity of the displacement is detected by counting the quantity of the phase difference based on a counting pulse which is synchronized with the reference wave and which has a frequency which is an integer multiple of that of the reference wave. However, although this method is useful for the resolver, the inductosyn or the like in which the reference wave can be formed by dividing the counting pulse, in such the detector as a laser length measuring device where the frequency of the reference wave is to be determined depending upon the intrinsic character of the laser oscillator, the counting pulse synchronized with the reference wave has been necessarily generated by means of a PLL (Phase Locked Loop) circuit. However the poor stability of the frequency of the reference wave in the laser oscillator has generated detecting errors caused by a response delay of the PLL circuit. Furthermore, such a displacement detecting apparatus must be provided with a high frequency counting pulse and its counter for obtaining a high resolution, thus exhibiting difficulties in improving the resolution.

FIG. 1 shows a constructional view of a laser length measuring device and a displacement detecting apparatus based on the conventional method. In this figure, a laser oscillator 1 generates two kinds of light beams $f_1$ and $f_2$ having different frequencies and different polarization planes. The combination of the outputted light beams $f_1$ and $f_2$ is optically divided by a beam splitter 2 into two paths, and then one path of the combined divided light beams $f_1$ and $f_2$ is converted by means of a photodetector 6 into an electric signal $F_R$ denoting the light-interference intensity for the light beams $f_1$ and $f_2$. Here, the frequency of the electric signal $F_R$ coincides with a difference in frequency between the light beams $f_1$ and $f_2$, and as is adopted as the reference wave $F_R$ ($F_R = |f_1 - f_2|$). The other path of the combined divided beams $f_1$ and $f_2$ is optically divided by another beam splitter 3 into two separate light beams $f_1$ and $f_2$, the light beam $f_1$ being directed to a movable reflecting mirror 5. When the light beam $f_1$ is directed to the movable reflecting mirror 5 and when the movable reflecting mirror 5 is moving in the X-axis direction, the light beam $f_1$ is affected by the doppler modulation of $\pm \Delta f$ which is proportional to the moving speed of the reflecting mirror 5, and consequently the reflected light beam $f_1 \pm \Delta f$ is generated. On the other hand, the light beam $f_2$ divided by the beam splitter 3 is reflected by a fixed reflecting mirror 4, and the reflected light beam $f_2$ is combined with the reflected light beam $f_1 \pm \Delta f$ by the beam splitter 3. The mixed beams $f_1 \pm \Delta f$ and $f_2$ are converted to an electric signal $F_P$ denoting the light interference intensity of light beams $f_1 \pm \Delta f$ and $f_2$ by means of photodetector 7. Here, the electric signal $F_P$ has a frequency which corresponds to the frequency difference between the light beams $f_1 \pm \Delta f$ and $f_2$. Accordingly, when the electric signal $F_R$ is adopted as the reference wave, the electric signal $F_P$ becomes a phase modulated wave which is formed by modulating in phase the reference signal $F_R$ by the shifted displacement X of the movable reflecting mirror 5. Concretely, if the wave length of the light beam $f_1$ is denoted by $\lambda$, the phase modulated wave $F_P$ is to be displaced by a shift $(4\pi/\lambda)X$.

The description above is directed to the basic principle for the laser length measuring device, and the operation of the displacement detecting apparatus of FIG. 1 will now be described with reference to the timing chart shown in FIGS. 2A to 2J.

Firstly, the reference wave $F_R$ outputted from the photodetector 6 is subjected to waveform shaping in a comparator 23 to form a signal $DF_R$ as shown in FIG. 2A, and the formed signal $DF_R$ is inputted into a phase comparing unit 9 to be compared with a most significant bit signal MSB (refer to FIG. 2B) of an outputted signal T' on a counter 8. Then, a voltage RV having a pulse width proportional to the phase shift is outputted. The voltage RV from the phase comparing unit 9 is smoothed by an LPF (low pass filter) 10, and inputted into a VCO (voltage controlling oscillator) 11 in order to oscillate and output a counting pulse CLK', as shown in FIG. 2C, having a frequency in accordance with the phase difference of the signal MSB from the signal $DF_R$. Then the counting pulse CLK' is inputted into the counter 8 to be divided by "64", as is shown in FIG. 2D, to be adopted as the most significant signal MSB of the counter output signal T'. As detailed above, a PLL circuit is constructed of the phase comparing unit 9, the LPF 10, the VCO 11 and the counter 8, and generates the counting pulse CLK' to be approximately synchronized with the reference wave $F_R$ and to have 64 times the frequency of the reference wave $F_R$. On the other hand, the output signal T' of the counter 8 is, as is shown in FIGS. 2A and 2D, formed to be a signal changing sawtoothwise from "0" to "63" within about one cycle of the reference wave $F_R$. The output signal T' of the counter 8 is stored as a signal x' as shown in FIG. 2F in a latch circuit 12 when the signal $DF_P$ falls down which, as shown in FIG. 2E, has been waveform-shaped from the phase modulated wave $F_P$ by the comparator 17. The signal x' becomes the phase difference of the phase modulated wave $F_P$ to the reference wave $F_R$ within the range of the wave length of the reference wave. Employing the heretofore, it is possible to detect the displacement X of the movable reflecting mirror 5 with a precision of up to $\lambda/2$.

The signal x' is stored as a signal x'' in a latch circuit 13 when the next falling transition of the phase modulated wave $F_P$ occurs. Consequently, the signal x'' is adopted to precede the signal x' changing. The signals x' and x'' are subjected to a subtraction operation in an updown pulse generator 14. The up pulse $U_P$ shown in FIG. 2H or down pluse $D_P$ is outputted based on the condition indicated by the following expression (1) in accordance with the subtraction value $\Delta x$ as shown in FIG. 2G.

$$\left.\begin{array}{l}\text{when } \Delta x \leq -32, \text{ then an up pulse } UP \text{ is outputted,} \\ \text{when } \Delta x \geq 32, \text{ then a down pulse } DP \text{ is outputted,} \\ \text{where } \Delta x = x' - x''.\end{array}\right\} \quad (1)$$

The up pulse $U_P$ and the down pulse $D_P$ from the up-down pulse generator 14 cause an up-down counter 15 to count up or down, respectively. The phase difference of the phase modulated wave $F_P$ from the reference wave $F_R$ is outputted in terms of the number $x_u$ of the wave length of the reference wave $F_R$ by way of the up-down counter 15 (refer to FIG. 2I). Here, a signal x having the signal x' as the lower digit and the signal $x_u$ as the upper digit, that is, the signal x of which value is $64 \times x_u + x'$ becomes the phase difference x of the phase modulated wave $F_P$ from the reference wave $F_R$. As a result, the shifted displacement X of the movable reflecting mirror 5 can be detected at a resolution of $\lambda/128$.

The broken line characteristic A indicated in FIGS. 2D, 2F and 2J shows the value where there is no follow-up delay caused by a PLL circuit, and the hatched portion B in FIG. 2J shows the error caused by the follow-up delay, i.e., the error of the displacement detection.

As shown, the conventional apparatus as shown in FIG. 1 is disadvantageously liable to yield a large displacement detection error as such depicted by the hatched portion B, compared with the case where there is no follow-up delay caused by a PLL circuit such as depicted by the signal x in the timing chart in FIG. 2J.

In the conventional example of FIG. 1, the frequency difference between oscillated light beams $f_1$ and $f_2$ of the laser oscillator 1, in other words, the frequency of the reference wave $F_R$ is apt to be varied or affected as shown in the timing charts of FIGS. 2A to 2J. For this reason, the PLL circuit having an LPF does not enable the frequency of the counting pulse CLK' to exactly synchronize with and follow up the frequency variations of the reference wave $F_R$, thus exhibiting a displacement detection value error caused by the follow-up error. Furthermore, in order to obtain the quantity of the displacement detection at a high resolution, it is necessary to provide a high frequency counting pulse and its counter, and consequently, it is difficult to realize the higher resolution.

SUMMARY OF THE INVENTION

The present invention has been accomplished in view of the above, and an object of the present invention is to provide a displacement detecting apparatus capable of converting a signal outputted from the displacement detector based on the phase modulating method of the laser length measuring device and like, to a highly precise numeric value proportional to the displacement quantity, as well as easily capable of detecting the quantity of the displacement detection at a high resolution.

According to one aspect of the present invention, for achieving the objects described above, there is provided a displacement detecting apparatus wherein a detector outputs a displacement as a phase modulated wave in respect to a reference wave, comprising: a first sample-hold means which samples said phase modulated wave at either or both of the timings when said reference wave rises or falls; a second sample-hold means which samples said phase modulated wave at the timing(s) delayed for a quarter cycle from either or both of the timing(s) when said reference wave rises or falls; an A/D converting means which converts said sampled signals from said first sample-hold means as well as second sample-hold means to respective digital values; and a numeral converting means which converts two digital values from said A/D converting means into said displacement.

According to another aspect of the present invention, there is provided a displacement detecting apparatus wherein a detector outputs a displacement as a phase modulated wave in respect to a reference wave, comprising: a converting means which converts said phase modulated wave into a rectangular pulse wave; a first memory means which stores said rectangular pulse wave at either or both of the timings when said reference wave rises or falls; and a second memory means which stores said rectangular pulse wave at the timing(s) delayed for a quarter cycle from either or both of the timing(s) when said reference wave rises or falls down; a counting means which counts up or down said displacement in accordance with the stored values in said first and second memory means.

These and other objects, features and advantages of the invention will become more readily apparent from the following detailed description when taken in conjunction with the illustrated embodiment in the accompany drawings.

BRIEF DESCRIPTION OF THE DRAWINGS

In the accompanying drawings:

FIGS. 2A to 2J are timing charts of the operational example of FIG. 1;

FIGS. 4A to 4S and FIGS. 5A to 5H are timing charts of the operational example of FIG. 3, respectively.

DESCRIPTION OF THE PREFERRED EMBODIMENT

The embodiment of the present invention will be explained hereinafter based on the accompanying drawings.

Figure 3:
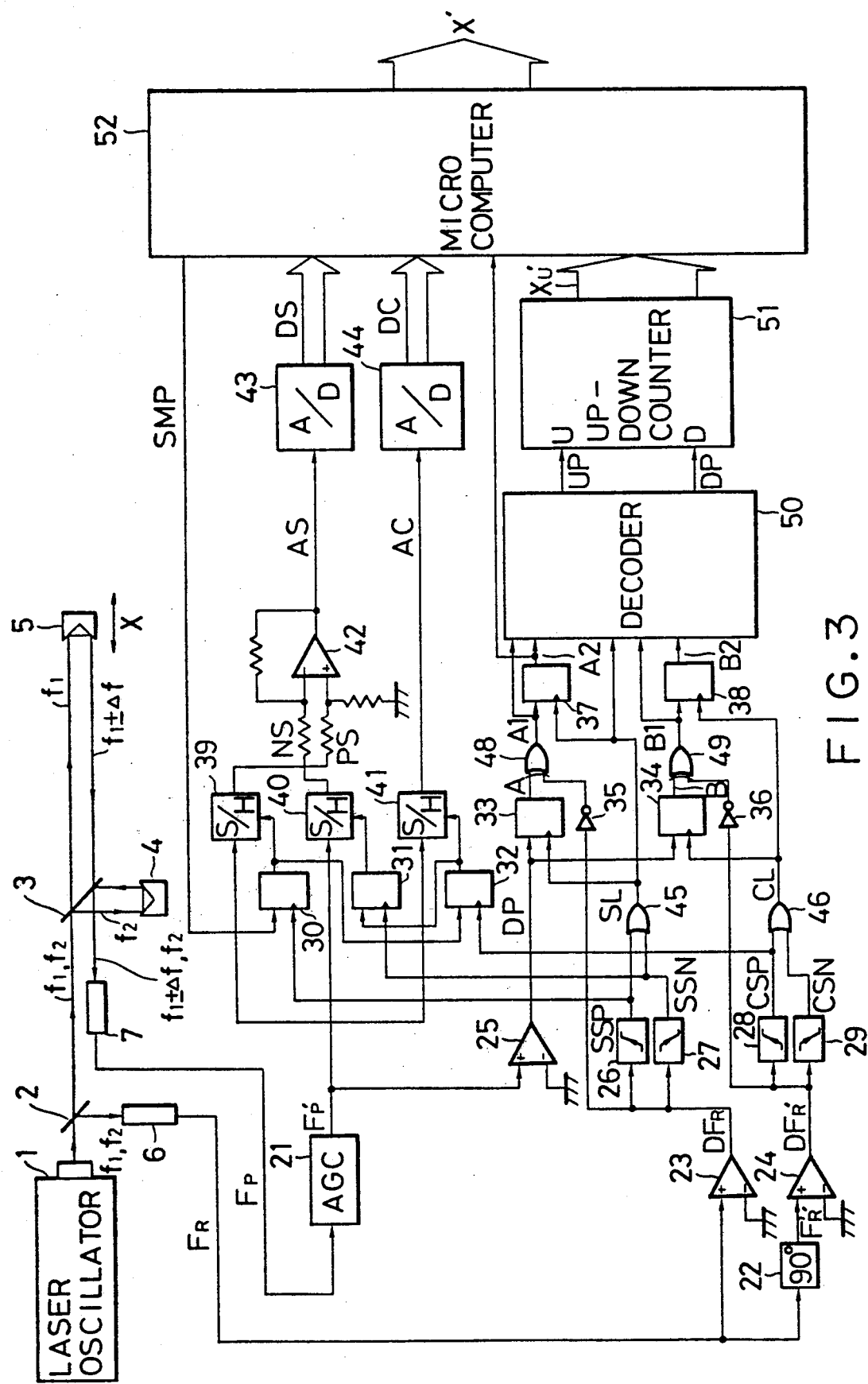
FIG. 3 is a block diagram showing an example of a displacement detecting apparatus of the present invention.

FIG. 3 is a constructional view of an example of a laser length measuring device and a displacement detecting apparatus of the present invention, corresponding to the FIG. 1, and the operation will be explained with reference to timing charts shown in FIGS. 4A to 4S and FIGS. 5A to 5H.

Figure 1:
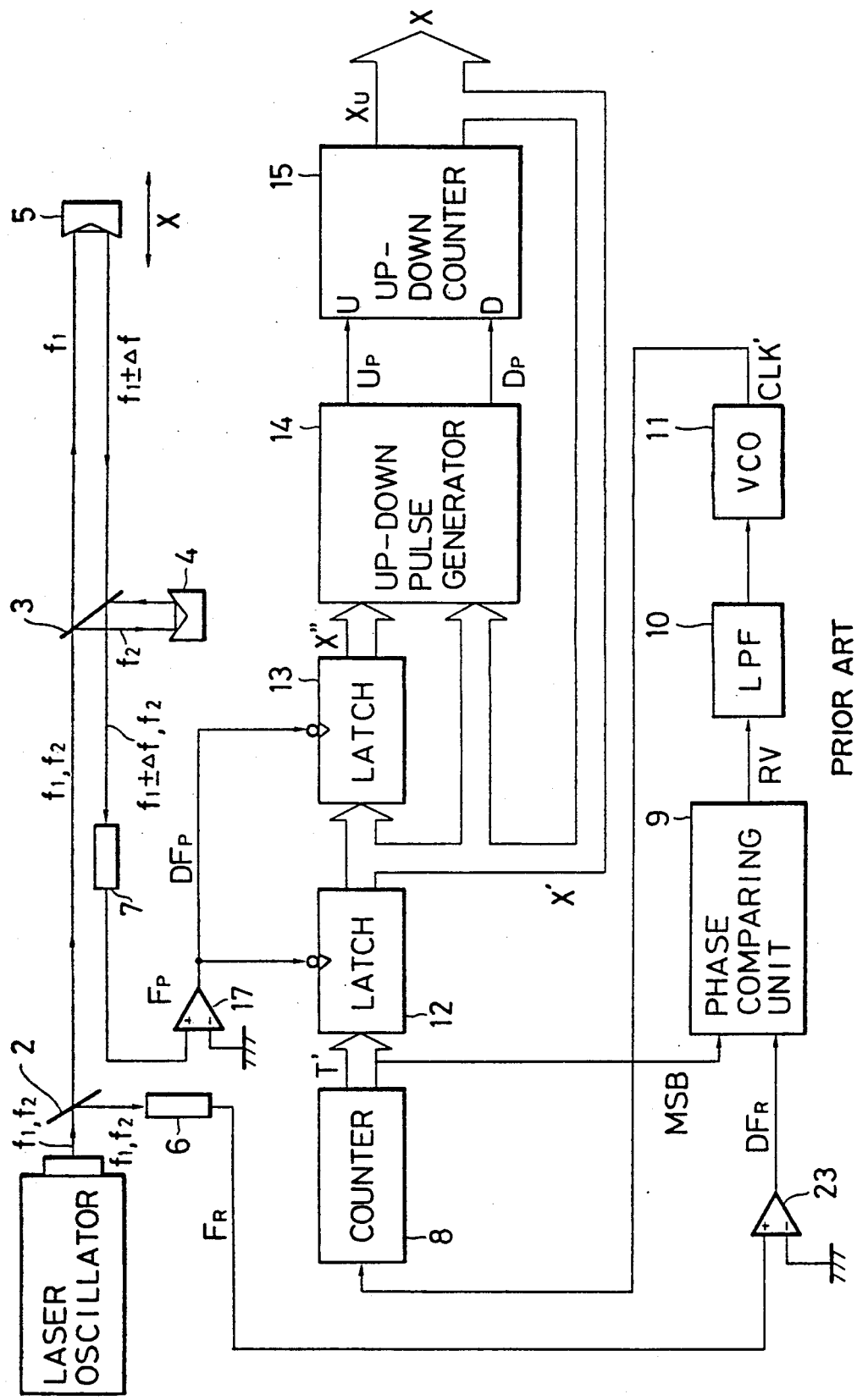
FIG. 1 is a block diagram showing an example of the conventional displacement detecting apparatus.

In FIG. 3, a laser oscillator 1, beam splitters 2 and 3, a fixed reflecting mirror 4, a movable reflecting mirror 5 and photodetectors 6 and 7 are the same as the constituents of the laser length measuring device shown in FIG. 1, and therefore, no explanation thereof will be repeated here.

A reference wave $F_R$, as is shown in FIG. 4A, outputted from the photodetector 6 is subjected to wave form shaping by means of a comparator 23, to be formed to a signal $DF_R$ as shown in FIG. 4C. Then, the formed signal is inputted into edge detectors 26 and 27 to output pulse signals SSP and SSN, as shown in FIGS. 4E and 4F, which are respectively synchronized with the rising transitions and the falling transitions of the reference wave $F_R$. On the other hand, the reference wave $F_R$ is reformed through an integrator 22 to a wave $F_R'$ having a waveform, as shown in FIG. 4B, being delayed by a quarter ($\pi/2$) phase of the cycle of the reference wave $F_R$. Then the wave $F_R'$ is shaped through a comparator 24 in a waveform of a signal $DF_R'$ as shown in FIG. 4D, in order to be inputted to the edge detectors 28 and 29. The edge detectors 28 and 29 in turn output respectively pulse signals CSP and CSN, shown in FIGS. 4G and 4H, which are synchronized with the timings delayed (hereinafter, this delay will be referred to as Tb) from the times of the rising transitions and the falling transitions of the reference wave FR by a quarter cycle of the reference wave $F_R$.

A phase modulated wave $F_P$, as shown in FIG. 4J, outputted from a photodetector 7 passes through an automatic gain controller 21 to be formed into a phase modulated wave $F_P'$ having a constant amplitude. The phase modulated wave $F_P'$ is sampled in sample-hold circuits 39, 40 and 41 by respective sampling signals from D-type flip flops 30, 31 and 32. Here, in the D-type flip flops 30, 31 and 32, the sampling command signal SMP, as shown in FIG. 4I, from a microcomputer 52 is amended into signals having timings in synchronization with the pulse signals SSP, SSN and CSP from the respective edge detectors 26, 27 and 28. Then, the amended signals are respectively inputted into the sample-hold circuits 39, 40 and 41. As a result, the phase modulated wave $F_P$ is sampled at the timings of the rising transition, the falling transition, and therebetween, respectively in the sample-hold circuits 39, 40 and 41.

Next, an explanation is provided as to how these sampled values relate to the shifted displacement X. Firstly, if the reference wave $F_R$ has an angular frequency of $\omega_R$, the wave is represented by the following expression (2):

$$F_R(t) = SIN(\omega_R t) \qquad (2)$$

On the other hand, the phase modulated wave $F_P'$ is represented by the following expression (3):

$$\begin{aligned} F_P'(t) &= SIN\{\omega_R t + (4\pi/\lambda)X\} \\ &= SIN(\omega_R t)COS\{(4\pi/\lambda)X\} + \\ &\quad COS(\omega_R t)SIN\{(4\pi/\lambda)X\} \end{aligned} \qquad (3)$$

Since a value PS (to be referred to FIG. 4K) is sampled by the sample-hold circuit 39 when the reference wave $F_R(t)$ rises, or $SIN(\omega_R t)=0$, $COS(\omega_R t)=1$, the value PS is obtained as the following expression (4) from the above expressions (2) and (3).

$$PS = SIN\{(4\pi/\lambda)X\} \qquad (4)$$

A value NS (referred to FIG. 4L), since it is sampled by the sample-hold circuit 40 when the reference wave $F_R(t)$ falls, or $SIN(\omega_R t)=0$, $COS(\omega_R t)=-1$, is represented by the following expression (5):

$$NS = -SIN\{(4\pi/\lambda)X\} \qquad (5)$$

Moreover, since a value AC (referred to FIG. 4N) is sampled by the sample-hold circuit 41 when the reference wave $F_R(t)$ stays between the rising transition and the falling transition, or $SIN(\omega_R t)=1$, $COS(\omega_R t)=0$, the value PS is obtained as the following expression (6):

$$AC = COS\{(4\pi/\lambda)X\} \qquad (6)$$

From these above expressions, it can be understood that the sample-hold circuits 39, 40 and 41 output values proportional to the sine value and the cosine value of the measured displacement X. It should be noted that the above expressions (4) to (6) hold in the case during the measuring displacement X being at rest. In the practical case where the measuring displacement X changes, if the measuring displacement X is assumed as x(t), i.e., X=x(t), then the above expressions (4) to (6) are respectively amended into the following expressions (7) to (9):

$$PS = SIN\{(4\pi/\lambda)x(t' - \pi/2\omega_R)\} \qquad (7)$$

$$NS = -SIN\{(4\pi/\lambda)x(t' + \pi/2\omega_R)\} \qquad (8)$$

$$AC = COS\{(4\pi/\lambda)x(t')\} \qquad (9)$$

It is known from the above expressions (7) to (9) that if the measuring displacement changes quickly, the sampled values PS and NS deviate from the sine value at a time t', i.e., $SIN\{(4\pi/\lambda)x(t')\}$. To deal with this situation, an operational amplifier 42 performs an operation processing as shown in the following expression (10) with the outputted signals PS and NS from the sample-hold circuits 39 and 40, so as to obtain a signal AS as shown in FIG. 4M.

$$AS = (PS - NS)/2 = \qquad (10)$$

$$\frac{SIN\left(\frac{4\pi}{\lambda} \times \left(t' - \frac{\pi}{2\omega_R}\right)\right) + SIN\left(\frac{4\pi}{\lambda} \times \left(t' + \frac{\pi}{2\omega_R}\right)\right)}{2}$$

The above expression (10) denotes the average of the values before and after the value $SIN\{(4\pi/\lambda)x(t')\}$, from this fact, by assuming $AS \approx SIN\{(4\pi/\lambda)x(t')\}$, it is possible to obtain the values AS and AC which are proportional to the sine value and the cosine value of the measuring displacement X at approximately the same time t' even when the measuring displacement changes rapidly.

The signals AS and AC are converted into numerals by means of A/D converters 43 and 44 to be inputted respectively to the microcomputer 52 as a sine value signal DS and a cosine value signal DC.

In the microcomputer, the following expression (11) is carried out by software processing:

When $DS \geq 0$, $DC \geq 0$ and $DS \leq DC$, (11)
then $X_L = 256 \times (\tan^{-1}(DS/DC)/2\pi)$;
when $DS \geq 0$, $DC \geq 0$ and $DS > DC$,
then $X_L = 64 - 256 \times (\tan^{-1}(DC/DS)/2\pi)$;
When $DS \geq 0$, $DC < 0$ and $DS \geq -DC$,
then $X_L = 64 + 256 \times (\tan^{-1}(-DC/DS)/2\pi)$;
When $DS \geq 0$, $DC < 0$ and $DS < -DC$,
then $X_L = 128 - 256 \times (\tan^{-1}(-DS/DC)/2\pi)$;
When $DS < 0$, $DC < 0$ and $-DS \leq -DC$,
then $X_L = 128 + 256 \times (\tan^{-1}(DS/DC)/2\pi)$;
When $DS < 0$, $DC < 0$ and $-DS > -DC$,
then $X_L = 192 - 256 \times (\tan^{-1}(DC/DS)/2\pi)$;
When $DS < 0$, $DC \geq 0$ and $-DS \geq DC$,
then $X_L = 192 + 256 \times (\tan^{-1}(-DC/DS)/2\pi)$; and
When $DS < 0$, $DC \geq 0$ and $-DS < DC$,
then $X_L = 256 - 256 \times (\tan^{-1}(-DS/DC)/2\pi)$ According to the processing above, it is possible to represent the variation of the measuring displacement X up to $\lambda/2$ as a numeric value $X_L$ of "0" to "255".

As is understood from the explanation above, in the case where the measuring displacement X changes slowly, the same characteristic can be also obtained in such an apparatus which directly inputs the output signal sent from the sample-hold circuit 40 into the A/D converter 43.

On the other hand, the phase modulated wave $F_P'$ from the automatic gain controller 21 is shaped to be a signal $D_P$ having a wave form as shown in FIG. 40, and the resultant signal is inputted to the D-type flip flops 33 and 34. When the D-type flip flops 33 and 34 receive pulse signals SL (refer to FIG. 5A) and CL outputted respectively from OR circuits 45 and 46 which, in turn receive the pulse signals SSP and SSN, and CSP and CSN outputted from the edge detectors 26 and 27, and 28 and 29 respectively, the D-type flip flops 33 and 34 store values A (refer to FIG. 4P) at the times when the reference wave $F_R$ rises and falls, and values B (refer to FIG. 4R) at the times when a time delay Td has passed after the reference wave $F_R$ rises and falls. Signals $DF_R$ and $DF_R'$ from the comparators 23 and 24 are reversed in NOT circuits 35 and 36 to be inputted into exclusive-OR circuits 48 and 49. Then, the exclusive-OR circuits 48 and 49 alternatively reverse the signals A and B from the D-type flip flops 33 and 34 by receiving signals outputted from the NOT circuits 35 and 36 respectively, and the resultant reversed signals A1 (refer to FIG. 4Q), B1 (refer to FIG. 4S) are inputted in the D-type flip flops 37 and 38.

Here the signals A1 and B1 are, as are estimated from the above expressions (4) to (6), represented by the following expressions (12) and (13) respectively.

$$\left. \begin{array}{l} \text{When } \text{SIN}\{(4\pi/\lambda)/X\} > 0, \text{ then } A1 = 1 \\ \text{When } \text{SIN}\{(4\pi/\lambda)/X\} < 0, \text{ then } A1 = 0 \end{array} \right\} \quad (12)$$

$$\left. \begin{array}{l} \text{When } \text{COS}\{(4\pi/\lambda)/X\} > 0, \text{ then } B1 = 1 \\ \text{When } \text{COS}\{(4\pi/\lambda)/X\} < 0, \text{ then } B1 = 0 \end{array} \right\} \quad (13)$$

From the expressions (12) and (13), it can be understood that the signals A1 and B1 are equivalent to the output signals by a two-phase type pulse generator varying with the variations of the measuring displacement X. Accordingly, while the measuring displacement X varies at a constant rate, the signals A1 and B1 vary as shown in FIGS. 5B and 5C.

Further, the D-type flip flops 37 and 38 record the one-step preceding values of the signals A1 and B1 which are to be changed by the pulse signals SL and CL from the OR circuit 45 and 46, as values A2 (refer to FIG. 5D) and B2 (refer to FIG. 5E). Then the signals A1, A2, B1 and B2 are inputted into a decoder 50, which determines based upon the following expression (14), counting pulses UP (refer to FIG. 5F) and DP (refer to FIG. 5G) which respectively increases and decreases the value of an up-down counter 51, by using these signals and the pulse signal SL from the OR circuit 45. This resultant is inputted into an updown counter 51.

$$\left. \begin{array}{l} \overline{UP} = A1 \cdot B1 \cdot A2 \cdot B2 \cdot \overline{SL} \\ \overline{DP} = A1 \cdot B1 \cdot A2 \cdot B2 \cdot \overline{SL} \end{array} \right\} \quad (14)$$

Then, the microcomputer 52 receives from the up-down counter 51 a numeric signal $Xu'$ indicating the variation of the displacement X at the resolution of up to $\lambda/2$, as shown in FIG. 5H, and picks up the numeric signal $Xu'$, and the signal A2 from the D-type flip flop 37 at the timing when the sample command signal SMP is outputted. By effecting the processing shown in the following expression (15) based on the classification of the relation between the most significant bit MSB of the numeric value $X_L$ and the signal A2, the numeric signal $Xu'$ is transfomed to the upper digit numeric value Xu which is to join smoothly to the numeral having the numeric value $X_L$ as the lower digit. The numeric value $X'$ having the numeric value Xu as the upper digit can express the long stroke of the measuring displacement X up to $\lambda/2 \times$(the maximum value of the up-down counter) at a resolution of $\lambda/512$.

$$\left. \begin{array}{l} \text{when } MSB = \overline{A2}, Xu = Xu'; \\ \text{when } MSB \neq \overline{A2} \text{ and } MSB = 0, Xu = Xu' + 1; \text{ and} \\ \text{when } MSB \neq \overline{A2} \text{ and } MSB = 1, Xu = Xu' - 1. \end{array} \right\} \quad (15)$$

In the above example, in order to respond the rapid change of the measuring displacement, the edge detectors 26, 27, 28 and 29 are engaged to record the phase modulated wave Dp in half the period of the reference wave $F_R$. However, it is also possible to perform the same operation by directly inputting the pulse signals SSP and CSP from the edge detectors 26 and 28 into the clock inputs of the D-type flip flops 33 and 34 respectively, and engaging as the signals A1 and B1 directly the output signals which have been prepared by storing each phase modulated wave into the D-type flip flops 33 and 34 at the same period with the reference wave $F_R$, although in this case, the responsiveness to the change of the measuring displacement is decreased to about a half that of the prior case.

According to the displacement detecting apparatus of the present invention discussed above, the displacement which is outputted from the detector as a phase modulated wave in respect to a reference wave, is determined based on the level of the phase modulated wave sampled in synchronization with the change of the frequency of the reference wave. Accordingly, it is possible to eliminate the detecting error of the displacement, even if the frequency of the reference wave varies. Further, since a high resolution can be realized by the low speed and high resolution A/D converter, there is no need for a high frequency-oscillating oscillator and high response counter, both of which have been necessary for the conventional apparatus, thus making it possible to provide a low cost apparatus.

In the foregoing, the present invention has been described in conjunction with the preferred embodiments illustrated in the drawings. It should be however, appreciated that the invention is not restricted to these embodiments. Various modification and variations will readily occur to those skilled in the art without departing from the spirit and scope of the invention.

What is claimed is:

1. A displacement detecting apparatus comprising:
   means for receiving a reference periodic signal and a phase modulated signal from a detector device, said phase modulated signal denoting a reflected wave which is phase modulated by a displacement of a reflector;

a first sample-hold means for sampling said phase modulated signal at a first timing corresponding to at least one of each rising transition and each falling transition of said reference periodic signal to obtain first sampled signals;

a second sample-hold means for sampling said phase modulated signal at a second timing corresponding to a quarter cycle delay of said periodic reference signal relative to said first timing to obtain second sampled signals;

an A/D converting means for converting said first and second sampled signals into first and second digital values; and a numeral converting means for converting said first and second digital values into a displacement value.

2. An apparatus as recited in claim 1, wherein one of said first and second sample-hold means includes first and second sample-hold circuits, wherein said first sample-hold circuit samples said phase modulated signal at a timing which is advanced a quarter cycle relative to a timing of the other of said sample-hold means and said second sample-hold circuit samples said phase modulated signal at a timing which is delayed a quarter cycle relative to the timing of the other of said sample-hold means, and wherein a mean value of the thus sampled signals of the first and second sample-hold circuits is obtained.

3. A displacement detecting apparatus comprising:
means for receiving a reference periodic signal and a phase modulated signal from a detector device, said phase modulated signal denoting a reflected wave which is phase modulated by a displacement of a reflector;

a converting means for converting said phase modulated signal into a rectangular pulse signal;

a first memory means for storing a value of said rectangular pulse signal at a first timing corresponding to at least one of each rising transition and each falling transition of said reference periodic signal;

a second memory means for storing a value of said rectangular pulse signal at a second timing corresponding to a quarter cycle delay of said reference periodic signal relative to said first timing; and, a counting means for increasing and decreasing a count value thereof in accordance with stored values of said first and second memory means.

4. An apparatus as recited in claim 3, wherein said first and second memory means store a value of said rectangular pulse signal at each half cycle of said reference periodic wave.

5. A displacement detecting apparatus comprising:
means for receiving a reference periodic signal and a phase modulated signal from a detector device, said phase modulated signal denoting a reflected wave which is phase modulated by a displacement of a reflector;

a first detection circuit comprising:
 (a) a first sample-hold means for sampling said phase modulated signal at a first timing corresponding to at least one of each rising transition and each falling transition of said reference periodic signal to obtain first sampled signals;
 (b) a second sample-hold means for sampling said phase modulated signal at a second timing corresponding to a quarter cycle delay of said reference periodic signal relative to said first timing to obtain second sampled signals;
 (c) an A/D converting means for converting said first and second sampled signals into first and second digital values; and
 (d) a numeral converting means for converting said first and second digital values into a displacement value;

a second detection circuit comprising:
 (a) a converting means for converting said phase modulated signal into a rectangular pulse signal;
 (b) a first memory means for storing a value of said rectangular pulse signal at a first timing corresponding to at least one of each rising transition and each falling transition of said reference periodic signal;
 (c) a second memory means for storing a value of said rectangular pulse signal at a second timing corresponding to a quarter cycle delay of said periodic reference signal relative to said first timing; and
 (d) a counting means for increasing and decreasing a count value thereof in accordance with stored values of said first and second memory means; and, a converting means for respectively converting said displacement value and said count value into a lower digit and an upper digit connecting said lower digit.

* * * * *